(12) United States Patent
Shimokawa et al.

(10) Patent No.: US 10,682,798 B2
(45) Date of Patent: *Jun. 16, 2020

(54) MOLDING APPARATUS

(71) Applicants: TOYOTA JIDOSHA KABUSHIKI KAISHA, Toyota-shi (JP); TOYOTA PRODUCTION ENGINEERING CORPORATION, Munakata-shi (JP); PLACO CO, LTD., Saitama-shi (JP)

(72) Inventors: Takuya Shimokawa, Nagakute (JP); Kaoru Shimomura, Nisshin (JP); Takashi Imai, Souka (JP)

(73) Assignees: TOYOTA JIDOSHA KABUSHIKI KAISHA, Toyota-shi (JP); TOYOTA PRODUCTION ENGINEERING CORPORATION, Munakata-shi (JP); PLACO CO, LTD., Saitama-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/196,666

(22) Filed: Nov. 20, 2018

(65) Prior Publication Data

US 2019/0160724 A1 May 30, 2019

(30) Foreign Application Priority Data

Nov. 24, 2017 (JP) ................................. 2017-226331

(51) Int. Cl.
| | |
|---|---|
| *B29C 49/04* | (2006.01) |
| *B29C 48/32* | (2019.01) |
| *B29C 49/32* | (2006.01) |
| *B29C 48/00* | (2019.01) |

(Continued)

(52) U.S. Cl.
CPC .......... *B29C 49/32* (2013.01); *B29C 48/0017* (2019.02); *B29C 48/30* (2019.02);
(Continued)

(58) Field of Classification Search
CPC .............. B29C 2049/047; B29C 49/04; B29C 48/0017; B29C 48/09; B29C 48/327; B29C 48/32; B29C 48/325
See application file for complete search history.

(56) References Cited

U.S. PATENT DOCUMENTS

| | | | | |
|---|---|---|---|---|
| 3,281,896 A | * | 11/1966 | Louis ...................... | B21C 25/00 425/466 |
| 4,124,351 A | * | 11/1978 | Garbuio .................. | B29C 48/30 425/532 |

(Continued)

FOREIGN PATENT DOCUMENTS

| | | | | |
|---|---|---|---|---|
| CA | 2297389 A1 | * | 7/2000 | ............. B29C 48/30 |
| EP | 0945245 A1 | * | 9/1999 | ............. B29C 49/04 |

(Continued)

*Primary Examiner* — Robert B Davis
(74) *Attorney, Agent, or Firm* — Oblon, McClelland, Maier & Neustadt, L.L.P.

(57) ABSTRACT

A molding apparatus includes: a die provided with a die recessed portion; a core being relatively movable toward a first side and a second side in an axial direction of the die, and forming a flow passage for molten resin between the core and the die; a slider housed in the die recessed portion, having a gap in the die radial direction between the slider and the die recessed portion, the slider being slidable in the die axial direction; and a wall portion forming part of an inner wall in the die radial direction of the die recessed portion, positioned to oppose the core, and extending in such a way that a thickness of the wall portion gradually decreases heading from the first side toward the second side; wherein the wall portion is elastically flexible outward in the die radial direction in a case in which the wall portion is pushed by the molten resin.

4 Claims, 14 Drawing Sheets

(51) Int. Cl.
*B29C 48/30* (2019.01)
*B29C 48/325* (2019.01)
*B29K 105/00* (2006.01)
*B29C 48/09* (2019.01)

(52) U.S. Cl.
CPC .......... *B29C 48/302* (2019.02); *B29C 48/327* (2019.02); *B29C 49/04* (2013.01); *B29C 48/09* (2019.02); *B29C 2049/047* (2013.01); *B29C 2049/048* (2013.01); *B29C 2948/92904* (2019.02); *B29K 2105/0067* (2013.01); *B29K 2105/258* (2013.01)

(56) References Cited

U.S. PATENT DOCUMENTS

| | | | |
|---|---|---|---|
| 6,773,249 B1 * | 8/2004 | Przytulla | B29C 48/30 |
| | | | 425/141 |
| 10,464,250 B2 * | 11/2019 | Shimokawa | B29C 49/32 |
| 2014/0113016 A1 | 4/2014 | Ito et al. | |
| 2015/0021811 A1 | 1/2015 | Eckhardt et al. | |
| 2017/0341286 A1 | 11/2017 | Shimokawa et al. | |

FOREIGN PATENT DOCUMENTS

| | | | | | |
|---|---|---|---|---|---|
| GB | 1183027 | A | * | 3/1970 | ............. B29C 48/30 |
| GB | 2089278 | A | * | 6/1982 | ............. B29C 48/30 |
| JP | 7-144355 | | | 6/1995 | |
| JP | 8-323843 | | | 12/1996 | |
| JP | 5427834 | | | 2/2014 | |
| JP | 2017-209878 | | | 11/2017 | |
| JP | 2017-222181 | | | 12/2017 | |

\* cited by examiner

MOLDING APPARATUS

CROSS-REFERENCE TO RELATED APPLICATION

This application claims priority under 35 USC 19 from Japanese Patent Application No. 2017-226331 filed on Nov. 24, 2017, the disclosure of which is incorporated by reference herein in its entirety.

BACKGROUND

Technical Field

The present disclosure relates to a molding apparatus.

Related Art

Japanese Patent Application Laid-open (JP-A) No. H8-323843 discloses a parison molding apparatus that causes molten resin to pass through a resin flow passage formed by a core and a die and causes plural divided ring portions provided in an annular groove in the die to slide to thereby change a size of a distribution portion of the resin flow passage and adjust the thickness of a parison.

In this parison molding apparatus, the divided ring portions are slid by a cylinder via a link portion. When a rod of the cylinder moves forward, the divided ring portions descend downward.

In the structure disclosed in JP-A No. H8-323843, the cylinder that is an actuator is secured to a body of the die, and the cylinder and the divided ring portions are linked to each other by the link portion. For this reason, when the actuator (cylinder) moves in a direction away from the core (outward in a radial direction) due to thermal expansion of the die, the divided ring portions also follow and move outward in the radial direction.

Additionally, there is the concern that a gap will form between the divided ring portions and part of the die positioned on a core side (inner side in the radial direction) thereof and that the molten resin will flow out into this gap.

In order to restrain the formation of this gap, it suffices to provide a member that urges the divided ring portions toward the core side, for example, but if a device for urging is provided, this leads to an increase in the size and cost of the molding apparatus.

SUMMARY

In consideration of the circumstances described above, it is an object of the present disclosure to restrain outflow of the molten resin when the die has expanded, while keeping the size and cost of the molding apparatus from increasing.

A first aspect of the disclosure is a molding apparatus including: a die that has a hollow cylinder shape, and that is provided with a die recessed portion, the die recessed portion is open toward a second side in an axial direction of the die; a core that is disposed on a radial direction inner side of the die, that is relatively movable toward a first side and the second side in an axial direction of the die with respect to the die, and that forms a flow passage for molten resin between the core and the die; a slider that is housed in the die recessed portion in a state in which a gap in the die radial direction exists between the slider and the die recessed portion, the slider is slidable in the die axial direction; a wall portion that forms part of an inner wall in the die radial direction of the die recessed portion, that is positioned to oppose the core, and that extends in such a way that a thickness of the wall portion gradually decreases heading from the first side toward the second side in the die axial direction; and a slide mechanism that causes the slider to slide in the die axial direction. The wall portion is elastically flexible outward in the die radial direction in a case in which the wall portion is pushed by the molten resin flowing through the flow passage.

In this molding apparatus, the molten resin flows through the flow passage between the die and the core, and the resin is molded. The slider is moved in the die axial direction by the slide mechanism, whereby the width of the flow passage can be adjusted.

The wall portion that forms part of the inner wall of the die recessed portion is positioned to oppose the core, so movement of the slider toward the core side is limited by the wall portion. The wall portion extends in such a way that its thickness gradually decreases heading from the first side toward the second side of the die, and the wall portion is elastically flexible outward in the radial direction when it is pushed by the molten resin flowing through the flow passage.

The wall portion is pushed against the slider when it flexibly deforms outward in the radial direction, so the formation of a gap between the wall portion and the slider can be restrained and outflow of the molten resin through this gap can be restrained.

The molding apparatus of a second aspect of the disclosure is the first aspect, wherein the slide mechanism has a rod and a moving unit. A slider recessed portion is formed at a surface of the slider at a die radial direction outer side of the slider, which is an opposite side from a core side. A distal end portion of the rod is housed in the slider recessed portion in an unlinked state with the slider. The slider is slid in the die axial direction by movement of the distal end portion in the die axial direction. The moving unit is attached to the die and causes the distal end portion of the rod to move in the die axial direction. Inner surfaces of the slider recessed portion on the first side and the second side in the die axial direction have a shape that is widened outward from inside in the die radial direction or that is substantially parallel in the die radial direction.

At the slider housed in the die recessed portion, the slider recessed portion is formed at the surface at a die radial direction outer side of the slider which is the opposite side from the core side. The slide mechanism has the rod and the moving unit, and the distal end portion of the rod is housed, in an unlinked state to the slider, in the slider recessed portion. The distal end portion of the rod is moved in the die axial direction by the moving unit, whereby the slider can be slid in the die axial direction.

The inner surfaces of the slider recessed portion on the first side and the second side in the die axial direction have a shape that is widened outward from inside in the die radial direction or that is substantially parallel in the die radial direction. In other words, in a cross section of the slider along the axial direction of the die, boundary lines of the slider recessed portion appear on the first side and the second side in the die axial direction, and these boundary lines incline in directions in which they are widened along the die radial direction or lie along the die radial direction. Here, "incline in directions in which they are widened" means that, out of the boundary lines of the slider recessed portion, the boundary line on the axial direction first side is inclined toward the axial direction first side heading in the die radial direction and the boundary line on the axial direction second side is inclined toward the axial direction second side heading in the die radial direction. Furthermore, "lie along the die radial direction" means that the boundary lines on the axial direction first side and the axial direction second side lie along the radius (a line orthogonal to the axis) of the die that is in the shape of a hollow cylinder. Furthermore, the boundary lines of the slider recessed portion appear even in a cross section orthogonal to the axial direction of the die, and these boundary lines incline in directions in which they are widened heading in the radial direction or lie along the radial direction of the die. Namely, the pair of boundary lines of the slider recessed portion do not incline in such a way as to narrow heading toward the opposite side from the core side. Consequently, when the die has thermally expanded, even if the moving mechanism provided at the die moves outward in the radial direction of the die and the rod also moves outward in the radial direction of the die, the distal end of the rod does not catch on the section of the slider that forms the slider recessed portion. Furthermore, the rod is not linked to the slider. For this reason, a force in the direction away from the wall portion does not act on the slider, so the formation of a gap between the slider and the wall portion can be restrained and outflow of the molten resin through this gap can be restrained. Outflow of the molten resin can be restrained without using a member that urges the slider toward the core side (the direction in which the slider is pushed against the wall portion), so the size and cost of the molding apparatus can be kept from increasing.

The molding apparatus of a third aspect of the disclosure is the first aspect or the second aspect, wherein the core has a core enlarged-diameter portion in which a diameter of the core is enlarged in such a way that an opposing surface of the core enlarged-diameter portion that opposes the wall portion inclines outward in the die radial direction heading toward the second side.

At the core enlarged-diameter portion at which the diameter of the core is enlarged, the opposing surface that opposes the wall portion of the die recessed portion is inclined outward in the die radial direction heading toward the second side; namely, the core enlarged-diameter portion gradually approaches the wall portion heading toward the second side. For this reason, the wall portion can be reliably pushed outward in the radial direction by the molten resin flowing through the flow passage.

The molding apparatus of the disclosure is given the above-described configuration, so it can restrain outflow of the molten resin when the die has expanded, while keeping the size and cost of the molding apparatus from increasing.

DETAILED DESCRIPTION

A molding apparatus 22 of a first embodiment will be described below with reference to the drawings.

Figure 1:
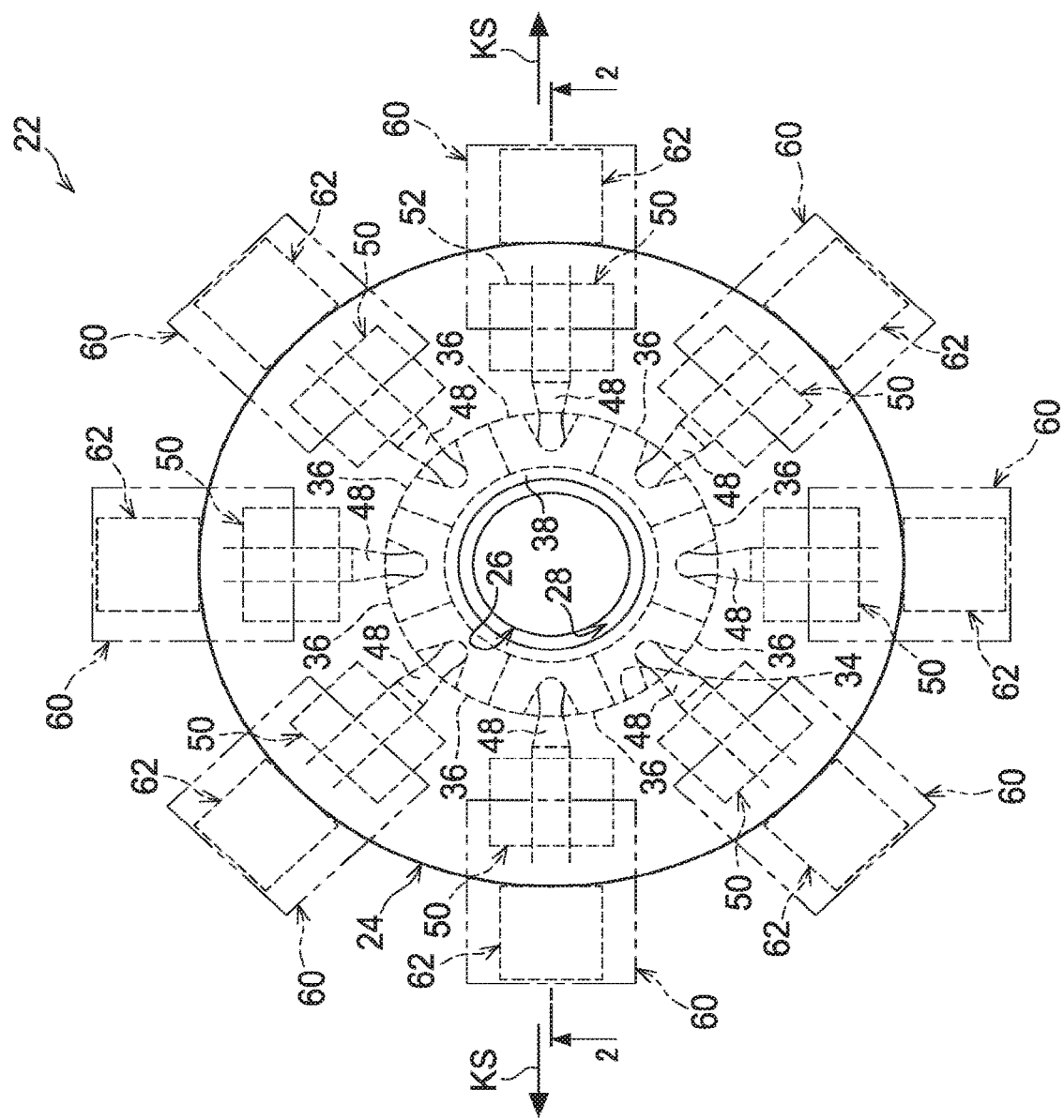
FIG. 1 is a plan view generally showing a molding apparatus of a first embodiment of the disclosure.
Figure 2:
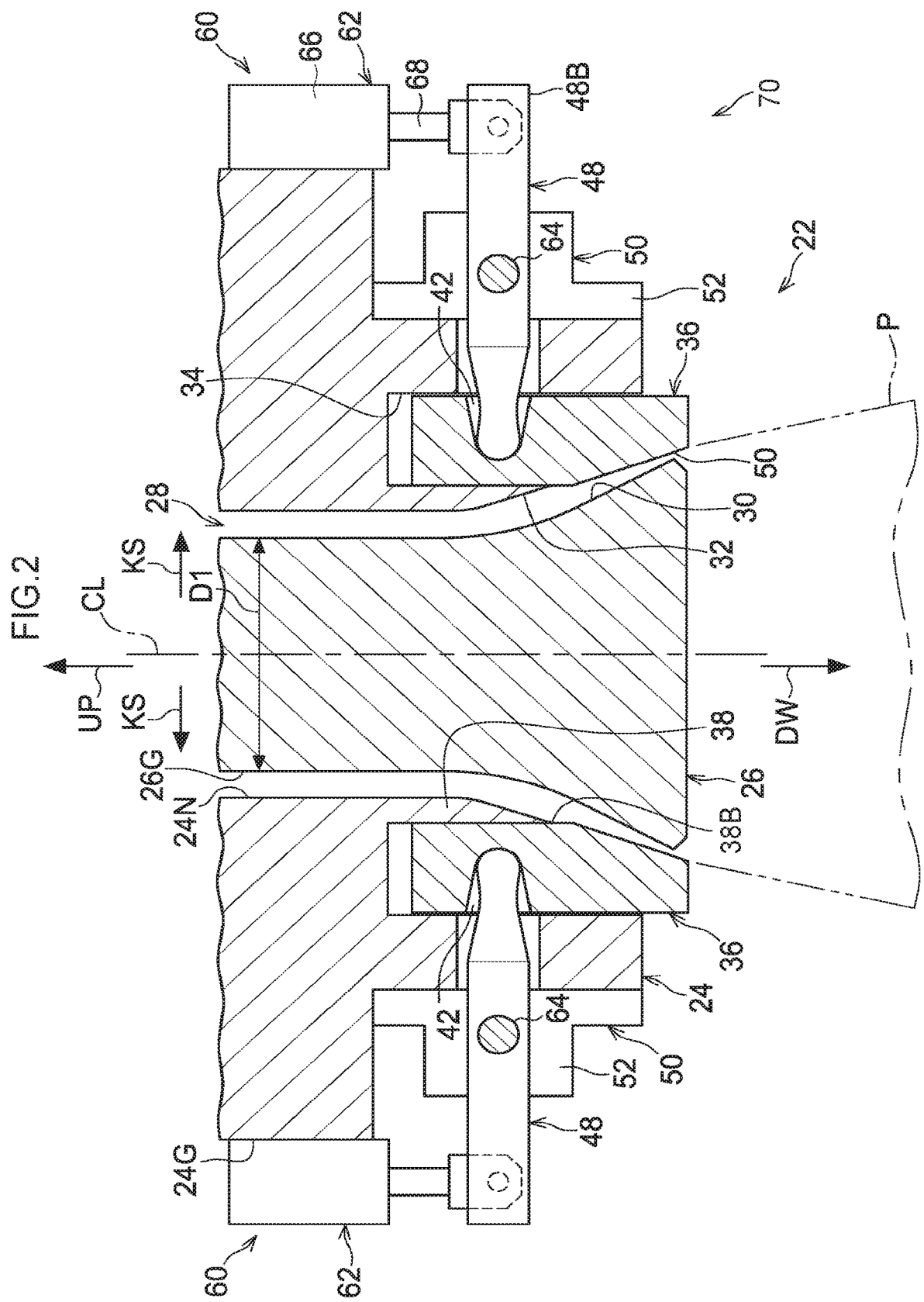
FIG. 2 is a sectional view along line 2-2 of FIG. 1 showing the molding apparatus of the first embodiment.

As shown in FIG. 1 and FIG. 2, the molding apparatus 22 of the first embodiment has a die 24 that is substantially in the shape of a hollow cylinder and a core 26 that is disposed inside the die 24. The core 26 is substantially in the shape of a solid cylinder or substantially in the shape of a hollow cylinder and is disposed coaxially with the die 24 (centerlines CL of the die 24 and the core 26 coincide with each other).

When using the molding apparatus 22, the molding apparatus 22 is disposed in such a way that, for example, one end side in an axial direction (a first side in the axial direction) of the die 24 and the core 26 becomes an upper side and the other end side (a second side in the axial direction) becomes a lower side. Namely, the molding apparatus 22 is positioned with the centerline CL aligned with the vertical direction. However, the positioning of the molding apparatus 22 when using the molding apparatus 22 is not limited to this. For example, the molding apparatus 22 may also be disposed in such a way that the centerline CL is aligned with the horizontal direction or is inclined with respect to the horizontal direction. Hereinafter, when the expression "axial direction" is simply used, this will mean the axial direction of the die 24 and the core 26, which coincides with an extension direction of the centerline CL. Furthermore, when the expression "one end side" or "other end side" is simply used, this will mean the one end side or the other end side in the axial direction of the die 24 and the core 26, which coincides with a one end side or the other end side of the molding apparatus 22. Moreover, when the expression "radial direction" is used, this will mean a radial direction of the die 24 and the core 26. In the drawings, arrow UP indicates an upward direction of the molding apparatus 22, arrow DW indicates a downward direction, and arrow KS indicates an outward direction in the radial direction. It will be noted that when the expression "upper side" or "lower side" is simply used, this will mean the "upper side" or the "lower side" in FIG. 2, FIG. 3, and other drawings.

Figure 3:
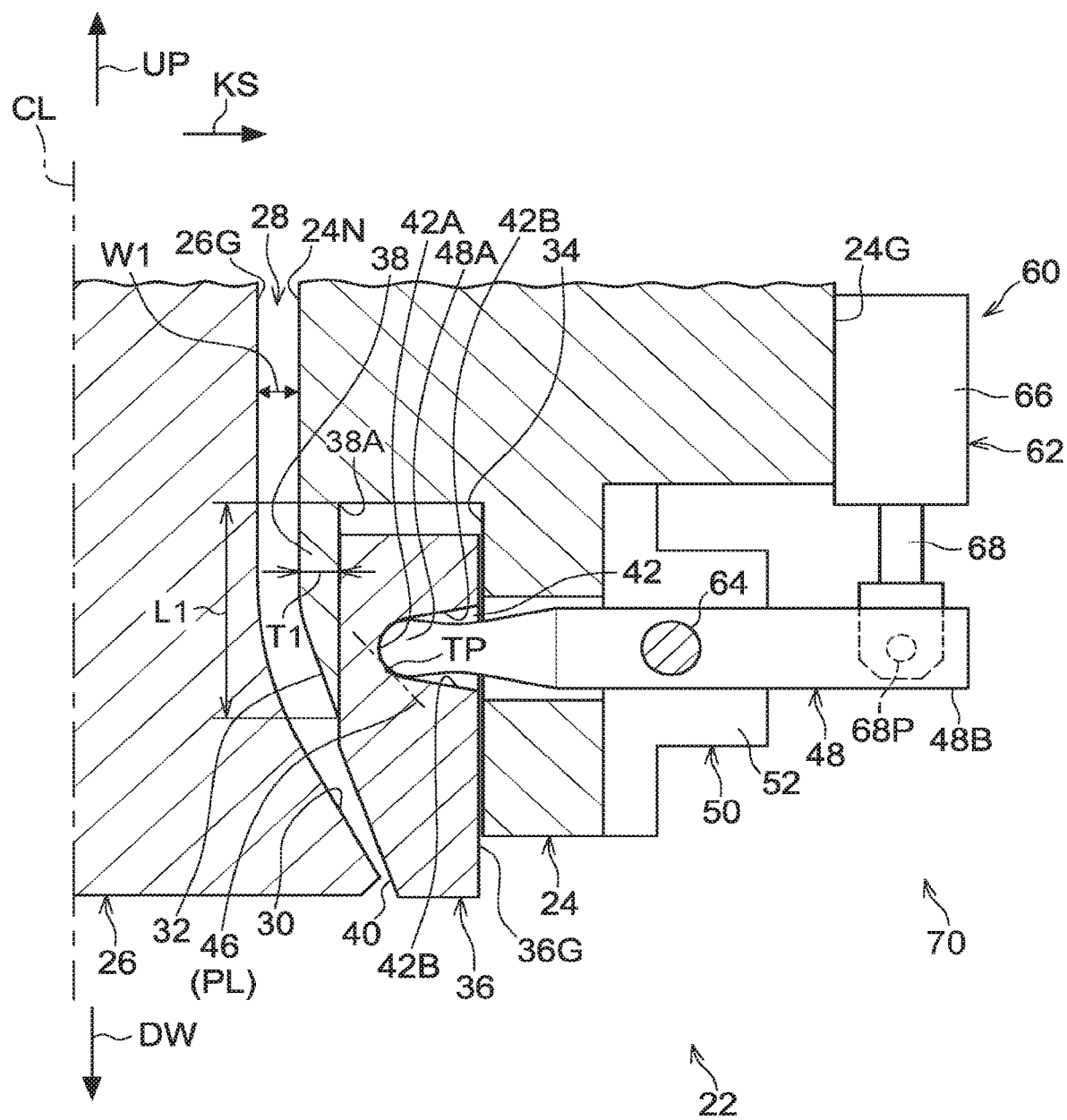
FIG. 3 is an enlarged sectional view showing part of the molding apparatus of the first embodiment.

As shown also in FIG. 3, between an inner peripheral surface 24N of the die 24 and an outer peripheral surface 26G of the core 26, a flow passage 28 for molten resin is formed. Molten resin is passed from the one end side to the other end side (from the upper side to the lower side in FIG. 2 and FIG. 3) in the flow passage 28, and a resin sheet P with a predetermined shape is molded. It will be noted that even if the molding apparatus 22 is disposed in such a way that the centerline CL is aligned with the horizontal direction or is inclined with respect to the horizontal direction, the molten resin is passed from the one end side to the other end side in the flow passage 28 to form a resin sheet with a predetermined shape.

Figure 4:
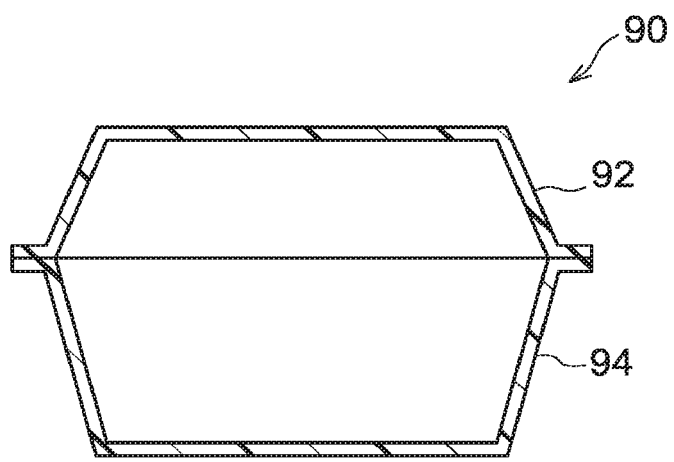
FIG. 4 is a sectional view showing a fuel tank using resin sheets molded by the molding apparatus of the first embodiment.

The resin formed in the predetermined shape in the molding apparatus 22 is, for example, used as a member that forms a fuel tank 90 shown in FIG. 4. In this case, in the molding apparatus 22, a tubular resin sheet is formed, this is set in a die and mold, and air is fed to an inside of the tubular resin sheet, whereby the fuel tank 90 with the desired shape can be molded (blow-molded). Furthermore, plural tabular resin sheets may also be obtained by cutting the tubular resin sheet at desired positions. In this case, two tabular resin sheets that have been obtained are set in a die and mold for molding, and air is fed between the resin sheets, whereby the resin sheets can be molded into fuel tank constituent bodies 92 and 94 with desired shapes.

In the molding apparatus 22, the core 26 is movable in the axial direction (the direction of arrow UP and the opposite direction, which is the direction of arrow DW) with respect to the die 24 by a moving mechanism not shown in the drawings.

On the other end side at the outer peripheral surface 26G of the core 26, a core enlarged-diameter portion 30 at which a diameter D1 (see FIG. 2) of the core 26 gradually increases heading toward the other end side is formed. Between this core enlarged-diameter portion 30 and a die enlarged-diameter portion or an opposing surface 40 of a separator 36 described later, a flow passage width W1 of the flow passage 28 changes heading toward the other end side because of movement of the core 26 in the axial direction.

In the die 24, a die recessed portion 34 that opens to the other end side is formed. As shown in FIG. 1, the die recessed portion 34 has an annular shape that is continuous in a circumferential direction of the die 24.

In the die recessed portion 34, plural separators 36 are housed. As shown in FIG. 1, the separators 36 are disposed adjacent to each other (eight in the example illustrated) in the circumferential direction of the die 24. Each separator 36 has a circular arc shape as viewed in the axial direction. Additionally, the plural separators 36 together encircle the core 26. The separators 36 are an example of sliders.

As shown in FIG. 2 and FIG. 3, in the die 24, a wall portion 38 positioned at a core 26 side with respect to the separators 36 is formed. The wall portion 38 extends from the one end side to the other end side (from the upper side to the lower side) at the die recessed portion 34, and the wall portion 38 forms part of an inner wall of the die recessed portion 34. In the cross sections that appear in FIG. 2 and FIG. 3, the wall portion 38 has a shape whose length L1 along the axial direction is longer than its thickness T1 along the radial direction. Additionally, the thickness T1 of the wall portion 38 gradually decreases heading from an axial direction base end 38A side (the one end side in the axial direction of the die 24) to a distal end 38B side (the other end side in the axial direction of the die 24) of the wall portion 38, so that the wall portion 38 has a tapered shape.

Figure 7:
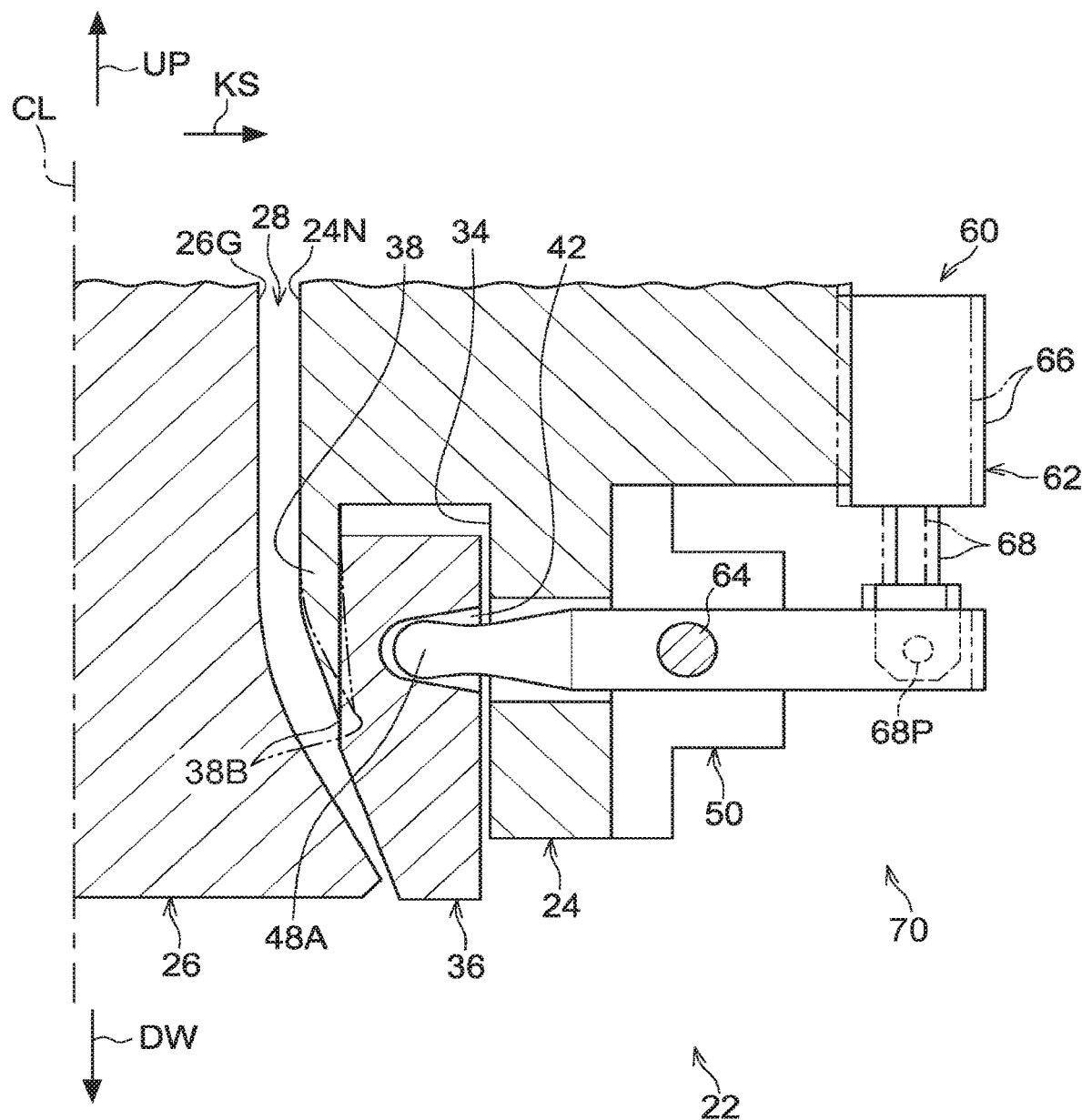
FIG. 7 is an enlarged sectional view showing part of the molding apparatus of the first embodiment.

The wall portion 38 is elastically flexibly deformable overall in such a way that its distal end 38B side heads outward in the radial direction. For example, as described later, the wall portion 38 flexibly deforms when it is pushed by the molten resin flowing through the flow passage 28. In FIG. 7, the shape of the wall portion 38 after flexibly deforming is indicated by the long dashed double-short dashed lines. In actuality, the separators 36 are at the radial direction outer side of the wall portion 38, so the amount of flexible deformation of the wall portion 38 is limited to a certain range as a result of the distal end 38B side contacting the separators 36. In FIG. 7, the flexible deformation of the wall portion 38 is depicted as being greater than it actually is.

In the core 26, the core enlarged-diameter portion 30 is also an opposing surface that opposes the wall portion 38. The core enlarged-diameter portion 30 is a surface that is inclined outward in the radial direction heading toward the other end side. Because the core enlarged-diameter portion 30 is inclined in this way, the wall portion 38 can be reliably pushed outward in the radial direction by the molten resin flowing through the flow passage 28.

Figure 5:
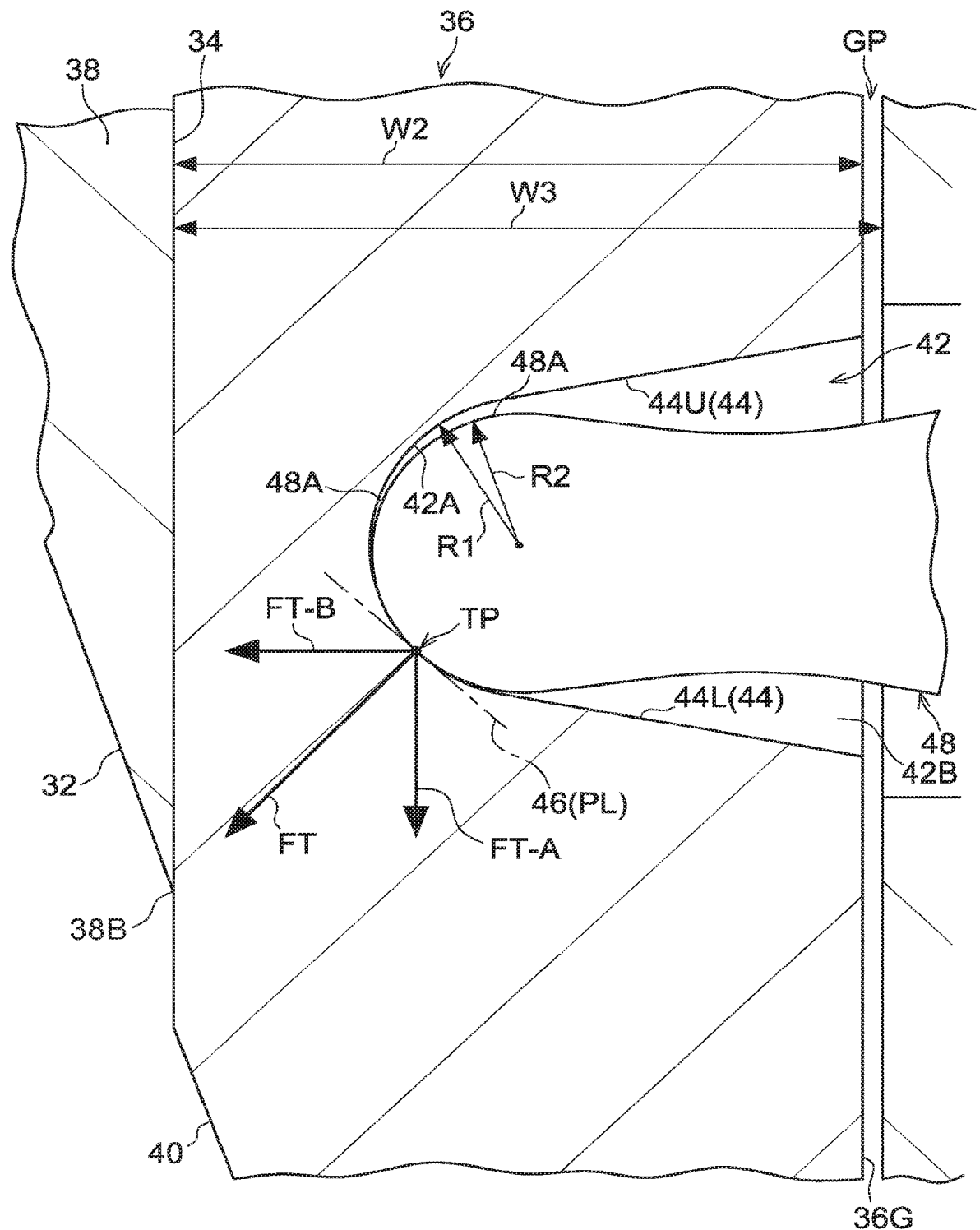
FIG. 5 is an enlarged sectional view showing the area around a separator recessed portion in the molding apparatus of the first embodiment.

As shown in FIG. 5, a width W2 (length in the radial direction) of each separator 36 is shorter than a width W3 (interval in the radial direction) of the die recessed portion 34. Consequently, a gap GP in the radial direction is formed between each separator 36 and the die recessed portion 34. As described later, each separator 36 is pushed inward in the radial direction by a rod 48, whereby the separator 36 is pushed against the wall portion 38. It will be noted that, in FIG. 5, the gap GP is depicted as being wider than it actually is.

The height of each separator 36 is determined in such a way that part of the separator 36 on the other end side sticks out at the other end side beyond the wall portion 38 and opposes the core 26.

As shown in FIG. 3, in the section of each separator 36 that opposes the core enlarged-diameter portion 30, the opposing surface 40 that inclines in a direction away from the core 26 heading toward the other end side is formed. The flow passage width W1 between the core enlarged-diameter portion 30 and the opposing surface 40 can be changed as a result of the core 26 moving in the axial direction (the direction of arrow UP and the direction of arrow DW). Furthermore, it is also possible to cut, at a desired position, the molten resin flowing through the flow passage 28 by bringing the opposing surface 40 into contact with the core enlarged-diameter portion 30.

The surface of each separator 36 at the opposite side from the core side (the side at which the separator 36 contacts the wall portion 38) is an outer peripheral surface 36G positioned at the outer peripheral side when the plural separators 36 are viewed together. At the outer peripheral surface 36G of each separator 36, a separator recessed portion 42 is formed. The separator 36 is an example of a slider, the separator recessed portion 42 is an example of a slider recessed portion.

The separator recessed portion 42 is recessed inward in the radial direction (the direction heading toward the centerline CL) from the outer peripheral surface 36G of the separator 36. As shown in FIG. 5, a far side (the portion near the centerline CL; the left side in FIG. 5) of the separator recessed portion 42 is a curved surface 42A that curves substantially in the shape of a hemisphere. The curved surface 42A appears as a circular arc in a cross section of the separator 36 along the axial direction. Hereinafter, R1 will denote a radius of the curved surface 42A.

As shown in FIG. 3 and FIG. 5, the open side (the portion far from the centerline CL) of the separator recessed portion 42 is an enlarged-diameter surface 42B that continues from the curved surface 42A and is widened in the shape of a circular truncated cone heading toward the outer peripheral surface 36G of the separator 36. The enlarged-diameter surface 42B appears as two boundary lines 44 on an upper side (the one end side in the axial direction) and a lower side (the other end side in the axial direction) in a cross section of the separator 36 along the axial direction (the cross section shown in FIG. 3). Additionally, the two boundary lines 44 are inclined in directions in which they are widened heading outward in the radial direction of the die 24. Specifically, a boundary line 44U on the upper side is inclined upward heading outward in the radial direction of the die 24, and a boundary line 44L on the lower side is inclined downward heading outward in the radial direction of the die 24. Furthermore, also in a cross section in a direction orthogonal to the centerline CL, the enlarged-diameter surface 42B appears as two boundary lines that incline in directions in which they are widened heading outward in the radial direction of the die 24. Consequently, the separator recessed portion 42 has a shape that is widened heading outward in the radial direction from inside in the radial direction.

As shown in FIG. 1 to FIG. 3, the molding apparatus 22 has plural (eight in the present embodiment) slide mechanisms 70 corresponding on a one-to-one basis with the separators 36. The slide mechanisms 70 causes the separators 36 to slide in the axial direction. Each slide mechanism 70 has a rod 48 and a moving mechanism 60.

Support members 50 each having a pair of support plates 52 are attached to the die 24 on a one-to-one basis with the rods 48. Each rod 48 is supported in the die 24 so as to be rotatable at its intermediate section by a spindle 64 provided at the support plates 52. A distal end portion 48A of the rod 48 is housed in the separator recessed portion 42 in a state in which it is not linked to the separator 36.

At the outer peripheral side of the die 24, the moving mechanisms 60 that correspond on a one-to-one basis with the rods 48 are provided. Each moving mechanism 60 includes an actuator 62 and the spindle 64.

The actuator 62 has a cylinder 66 secured to an outer peripheral surface 24G of the die 24. A piston 68 extends from the cylinder 66. The piston 68 is linked by a pin 68P to a rear end portion 48B of the rod 48 and moves in the axial direction (the up and down direction in FIG. 3). When the piston 68 is moved toward the one end side (the upper side) in the axial direction by the driving of the actuator 62, the rod 48 rotates about the spindle 64 and the distal end portion 48A moves toward the other end side (the lower side) in the axial direction. The distal end portion 48A of the rod 48 is housed in the separator recessed portion 42, so the separator 36 slides toward the other end side (the lower side) in the axial direction. Conversely, when the piston 68 moves toward the other end side (the lower side) in the axial direction, the separator 36 moves toward the one end side (the upper side) in the axial direction.

Figure 6:
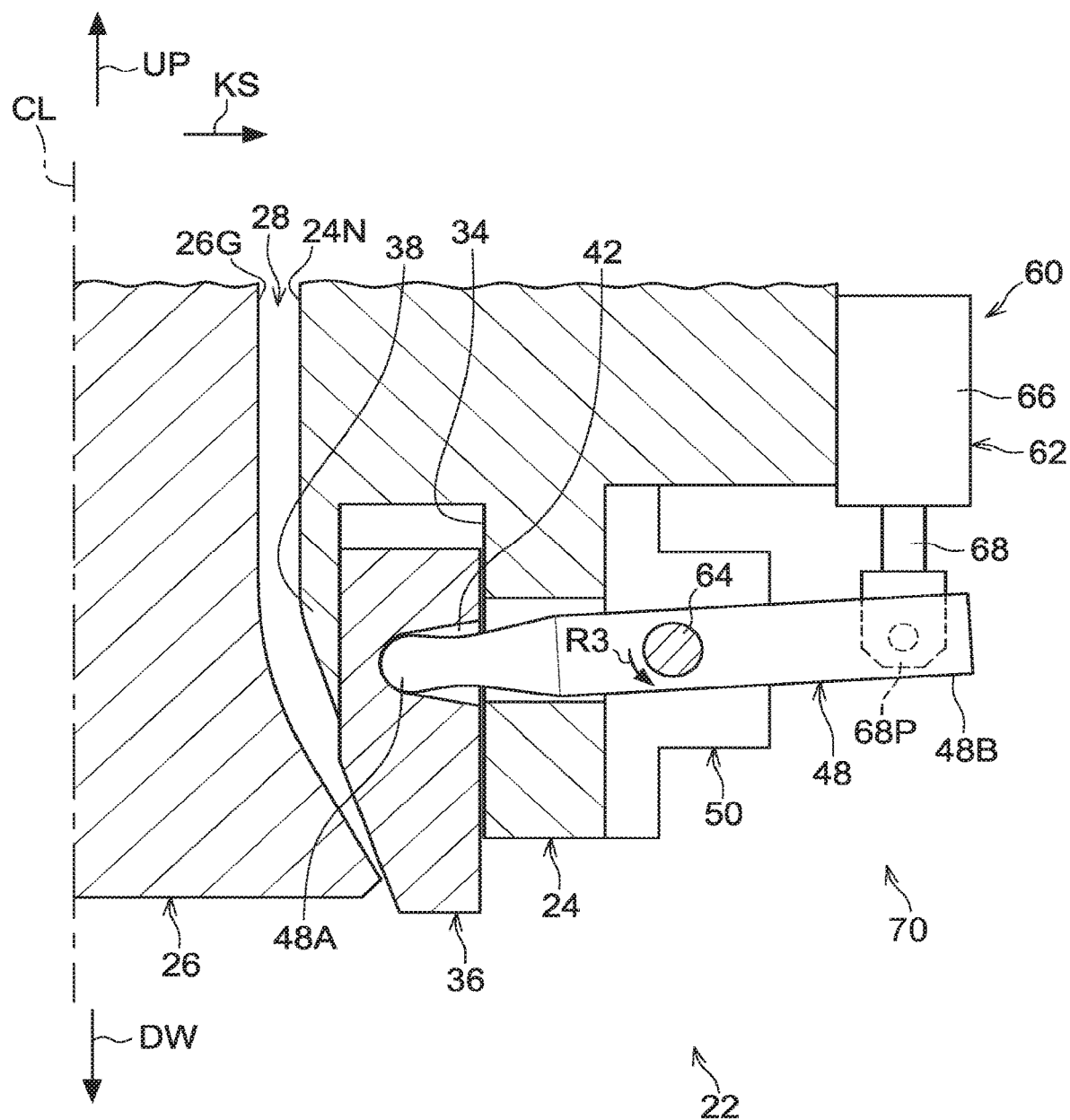
FIG. 6 is an enlarged sectional view showing part of the molding apparatus of the first embodiment.

In the present embodiment, as shown in FIG. 3, in an initial state a longitudinal direction of the rod 48 lies along the radial direction of the die 24. The posture (inclination) of the rod 48 is set in such a way that by moving the rear end portion 48B of the rod 48 from this initial state toward the one end side (the upper side in FIG. 6) in the axial direction to rotate the rod 48 in the direction of arrow R3 as shown in FIG. 6, the separator 36 is moved toward the other end side (the lower side in FIG. 6).

As shown in FIG. 5, the distal end portion 48A of the rod 48 is formed in the shape of a sphere with a radius R2. The radius R2 of the spherical end portion 48A is smaller than the radius R1 of the curved surface 42A of the separator recessed portion 42. Additionally, the position of the rod 48 in the initial state is set in such a way that the distal end portion 48A of the rod 48 touches the curved surface 42A of the separator recessed portion 42 at a touchpoint TP at the axial direction other end side (the lower side) from the center of the rod 48.

Consider a tangent plane PL of the curved surface 42A at the touchpoint TP at which the distal end portion 48A of the rod 48 touches the separator recessed portion 42. The tangent plane PL is an inclined plane 46 that inclines toward the open side (the lower side) of the die recessed portion 34 heading outward in the radial direction. When the distal end portion 48A of the rod 48 moves toward the other end side in accompaniment with the rotation of the rod 48 in the direction of arrow R3, the touchpoint TP also moves toward the other end side and the inclination of the inclined plane 46 (the tangent plane PL) becomes gentler. However, even in this case, the state in which the inclined plane 46 (the tangent plane PL) inclines toward the open side (the lower side) of the die recessed portion 34 heading outward in the radial direction is maintained.

It will be noted that the shape of the distal end portion 48A of the rod 48 is not limited to the spherical shape described above. For example, the rod 48 may also be formed in the shape of a solid cylinder or the shape of a prismatic column, and in this case the rod 48 has a shape where two corner portions appear in the distal end portion 48A of the rod 48 in the cross section shown in FIG. 3 and other drawings. Additionally, even when the rod 48 has the shape of a solid cylinder or the shape of a prismatic column, the size (diameter) and position of the rod 48 can be appropriately set in such a way that the tangent plane PL of the curved surface 42A at the touchpoint TP is the inclined plane 46 that inclines toward the open side (the lower side) of the die recessed portion 34 heading outward in the radial direction as described above.

Next, the action of the present embodiment will be described.

In the molding apparatus 22 of the present embodiment, molten resin flows through the flow passage 28 formed between the inner peripheral surface 24N of the die 24 and the outer peripheral surface 26G of the core 26, whereby the resin is molded into a desired shape. The core 26 can change the shape (width) of the flow passage 28 by moving in the axial direction with respect to the die 24.

The separator 36 housed in the die recessed portion 34 is slid in the axial direction by the moving mechanism 60. Because of this, the position of the opposing surface 40 of the separator 36 can be changed to further change the width of the flow passage 28.

In the present embodiment, as shown in detail in FIG. 5, the tangent plane PL at the touchpoint TP between the distal end portion 48A of the rod 48 and the curved surface 42A of the separator recessed portion 42 is the inclined plane 46 that inclines toward the open side (the lower side) of the die recessed portion 34 heading outward in the radial direction. Consequently, a force FT that acts in the normal direction of the inclined plane 46 when the distal end portion 48A of the rod 48 has moved toward the other end side (the lower side) in the axial direction can be divided into an axial direction component FT-A that acts toward the other end side (the lower side) in the axial direction and a radial direction component FT-B that acts inward (the side heading toward the core 26) in the radial direction. The radial direction component FT-B acts as a force that pushes the separator 36 against the wall portion 38, so formation of the gap GP between the separator 36 and the wall portion 38 can be restrained. The wall portion 38 limits, to a certain range, movement of the separator 36 inward (the direction heading toward the core 26) in the radial direction.

As shown in FIG. 7, sometimes the die 24 deforms because of thermal expansion, for example, in such a way that the outer peripheral surface 24G is widened outward in the radial direction. Additionally, the cylinder 66 and the rod 48 also move outward in the radial direction.

Figure 8:
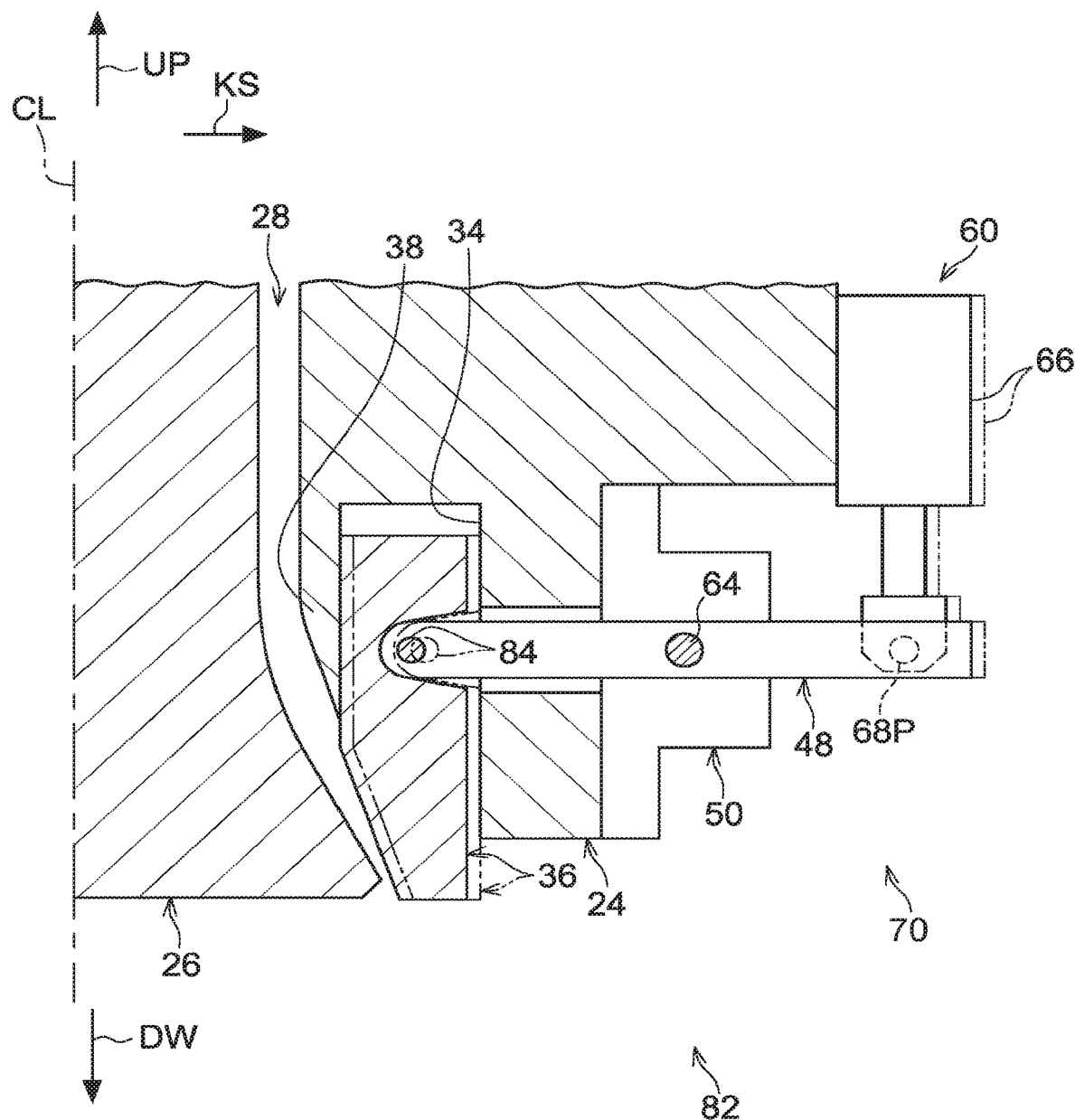
FIG. 8 is an enlarged sectional view showing part of a molding apparatus of a first comparative example.

Here, as shown in FIG. 8, as a first comparative example, consider a molding apparatus 82 with a structure where the rod 48 is linked by a pin 84 to the separator 36. Due to thermal expansion of the die 24, for example, in the molding apparatus 82 of the first comparative example, when the cylinder 66 moves outward in the radial direction, a force outward in the radial direction acts via the pin 84 on the separator 36 from the rod 48. As indicated by the long dashed double-short dashed lines in FIG. 8, there is the concern that when the separator 36 moves outward in the radial direction, a gap will be formed between the separator 36 and the wall portion 38.

Figure 9:
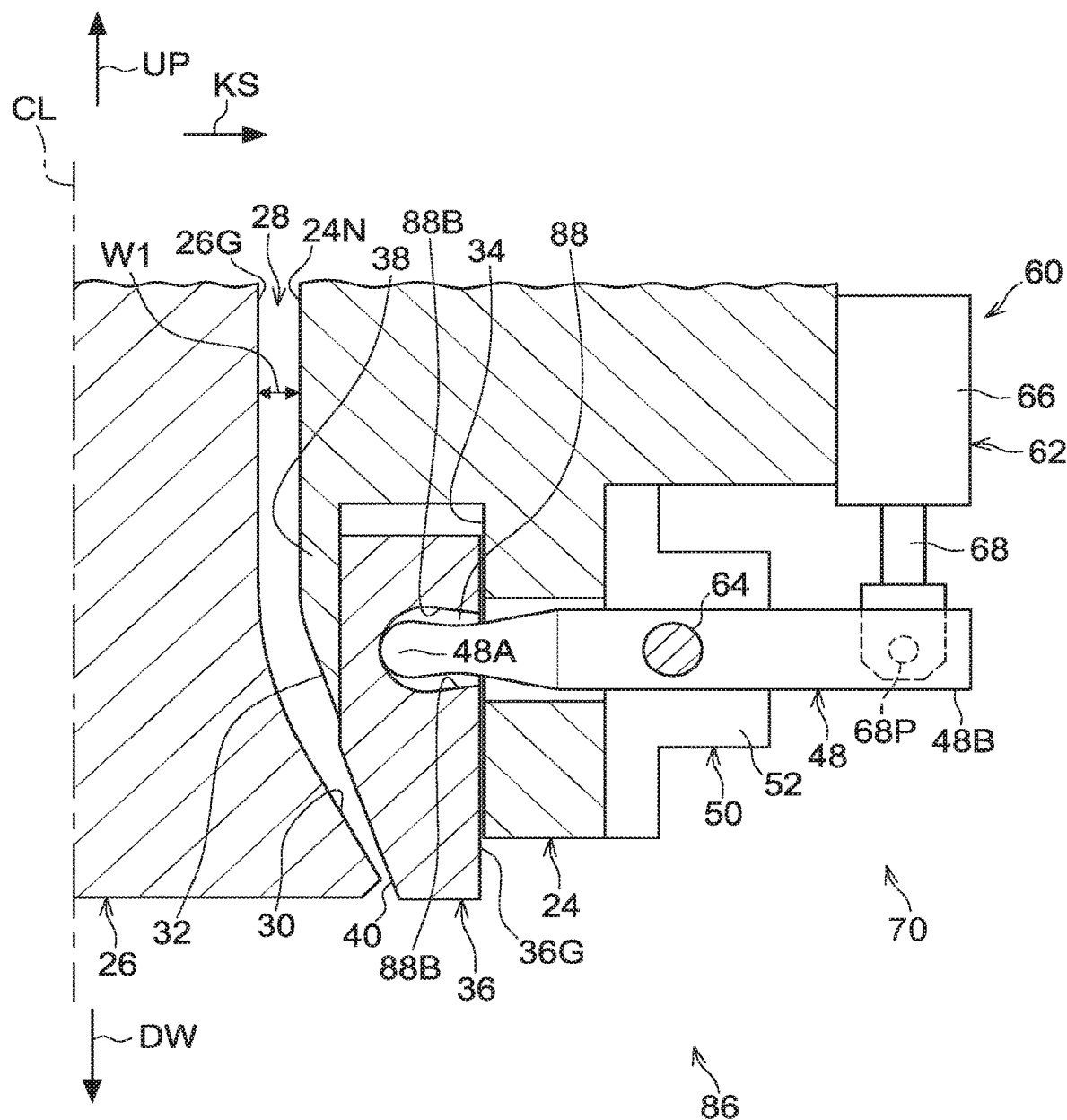
FIG. 9 is an enlarged sectional view showing part of a molding apparatus of a second comparative example.

Furthermore, as shown in FIG. 9, as a second comparative example, consider a molding apparatus 86 where a separator recessed portion 88 narrows heading toward an outer peripheral surface 36G (where upper and lower boundary lines 88B that appear in a cross section approach each other). In the molding apparatus 86 of the second comparative example, even in a structure where the rod 48 is not linked to the separator 36, depending on the posture of the rod 48, for example, sometimes part of the rod 48 trying to move outward in the radial direction catches on the separator 36. In particular, if the rod 48 is inclined with respect to the radial direction, it is easy for part of the rod 48 to catch on the separator 36. Additionally, if the rod 48 catches on the separator 36, a force outward in the radial direction acts on the separator 36. There is the concern that if the separator 36 moves outward in the radial direction, a gap will be formed between the separator 36 and the wall portion 38.

In contrast to the first comparative example and the second comparative example described above, in the molding apparatus 22 of the present embodiment, the rod 48 is not linked to the separator 36. Moreover, the boundary lines 44 of the separator recessed portion 42 that appear in the cross section shown in FIG. 5 are inclined in directions in which they are widened heading outward in the radial direction. Consequently, even if the rod 48 moves outward in the radial direction, the rod 48 does not catch on the separator 36. In particular, the rod 48 can be restrained from catching on the separator 36 even when the rod 48 is inclined with respect to the radial direction. Consequently, even if the rod 48 moves outward in the radial direction, a force outward in the radial direction does not act on the separator 36 from the rod 48.

In this way, because a force outward in the radial direction does not act on the separator 36, the formation of a gap between the separator 36 and the wall portion 38 caused by the separator 36 moving away from the wall portion 38 can be restrained. Because of this, the molten resin flowing through the flow passage 28 can be restrained from flowing out through this gap.

Moreover, it is not necessary to provide a member that urges the separator 36 toward (pushes the separator 36 against) the wall portion 38 in order to ensure that the separator 36 does not move away from the wall portion 38. For this reason, the size and cost of the molding apparatus 22 can be kept from increasing.

Additionally, as described above, the radial direction component FT-B of the force FT that acts in the normal direction of the inclined plane 46 from the distal end portion 48A of the rod 48 acts as a force that pushes the separator 36 against the wall portion 38, so the formation of a gap between the separator 36 and the wall portion 38 can be more reliably restrained. For example, it is assumed that a force that pushes the separator 36 outward in the radial direction acts on the separator 36 from the resin flowing through the flow passage 28. In this case, a rotational driving force with respect to the rod 48, the shape of the curved surface 42A, and the position of the touchpoint TP (the inclination of the inclined plane 46) are properly set in such a way that a greater force inward in the radial direction than the force outward in the radial direction acts on the separator 36 from the rod 48.

Moreover, in the present embodiment, when the wall portion 38 is subjected to the pressure of the molten resin flowing through the flow passage 28, the wall portion 38 flexibly deforms overall in such a way that the distal end 38B side heads outward in the radial direction. The distal end 38B side of the wall portion 38 is pushed against the separator 36, so the formation of a gap between the wall portion 38 and the separator 36 is more reliably restrained. Because of this, the molten resin can be restrained from flowing out from between the wall portion 38 and the separator 36, and the molding apparatus 22 can be stably operated.

Furthermore, in the present embodiment, because the molten resin does not flow out from between the wall portion 38 and the separator 36, there is also no outflowing molten resin remaining as extraneous matter on the parison. Because extraneous matter resulting from outflowing molten resin does not stick to the molded article molded by the molding apparatus 22 such as the resin sheets described above, for example, a molded article that is high in quality in this respect can be molded.

Next, a second embodiment will be described. It will be noted that, in the following embodiments and modified embodiments, elements and members that are the same as those in the first embodiment will be assigned identical reference signs and detailed description thereof will be omitted. Furthermore, the overall structures of the molding apparatus are also the same as in the first embodiment, so illustration thereof will be omitted.

Figure 10:
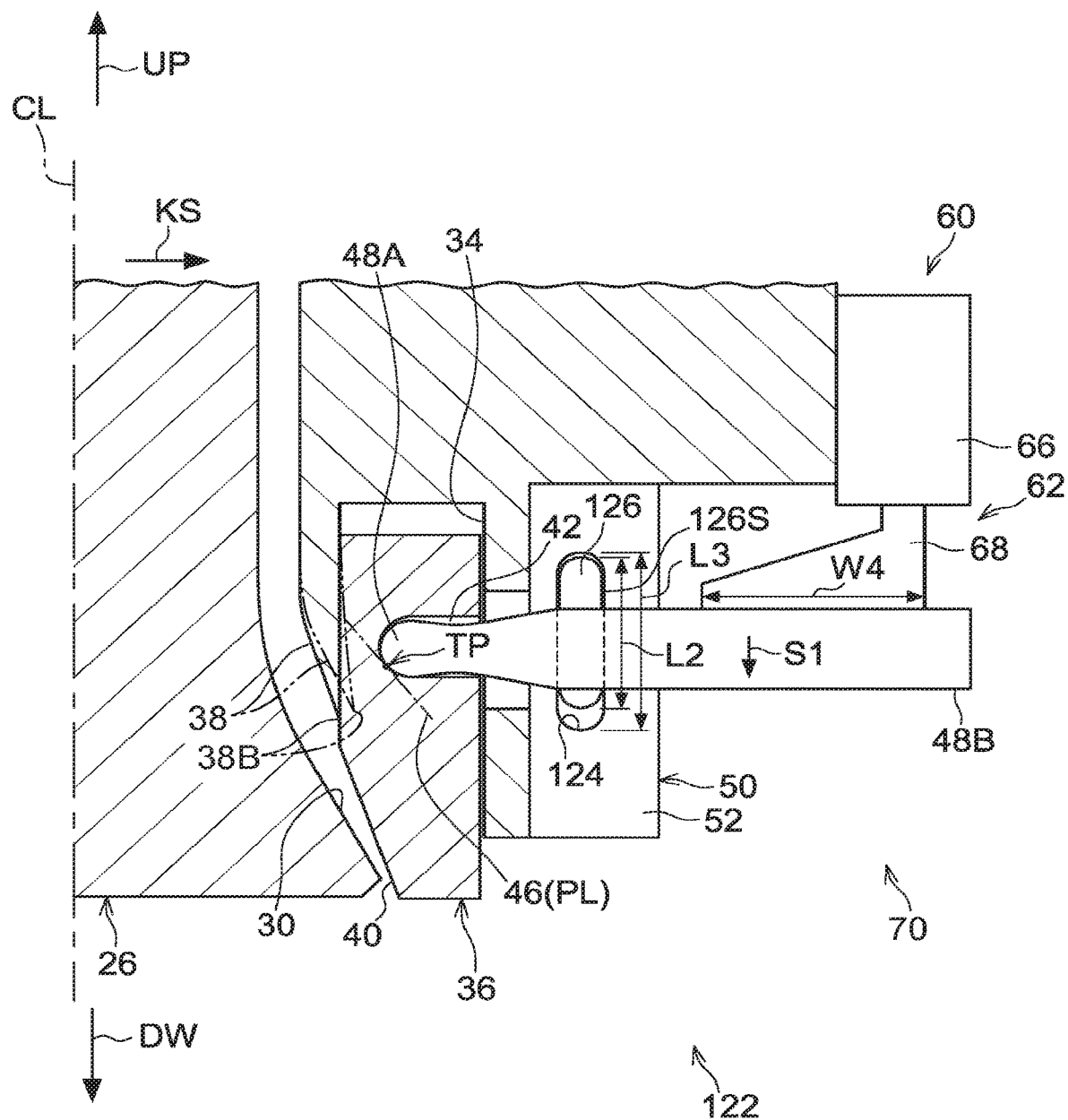
FIG. 10 is an enlarged sectional view showing part of a molding apparatus of a second embodiment of the disclosure.

As shown in FIG. 10, in a molding apparatus 122 of the second embodiment, a long hole 124 is formed at the pair of support plates 52 of the support member 50. A longitudinal direction of the long hole 124 coincides with the axial direction of the die 24, and the long hole 124 has a length L3.

A housed plate 126 housed in the long hole 124 is formed at an intermediate portion of the rod 48. The housed plate 126 has a predetermined length L2 in the axial direction, but L2 is shorter than L3. Consequently, the housed plate 126 moves in the axial direction while maintaining the state in which it is housed in the long hole 124. Furthermore, the housed plate 126 contacts the long hole 124 in a predetermined range in the axial direction at an inner surface 126U and an outer surface 126S in the radial direction. Because of this, the rod 48 of the second embodiment is slidable in the axial direction while maintaining its posture in the direction (the direction of arrow KS) orthogonal to the centerline CL in FIG. 10.

The piston 68 is secured, in a range of a predetermined width W4, to the rear end portion 48B side of the rod 48. Consequently, when the piston 68 moves toward the other end side (downward) in the axial direction, the piston 68 causes a downward force to act in the range of the width W4 on the rod 48, so the rod 48 tries to slide toward the other end side.

In the second embodiment, in order to cause the distal end portion 48A of the rod 48 to move toward the other end side (downward) in the axial direction, the actuator 62 drives the piston 68 to push the rear end portion 48B of the rod 48 toward the other end side (the lower side in FIG. 10) in the axial direction. Because of this, the rod 48 slides in the direction of arrow S1 and the distal end portion 48A moves toward the other end side in the axial direction.

In this way, the rod 48 is not limited to the structure in the first embodiment where it is rotatable by the spindle 64 and may also have the structure in the second embodiment where it is slidable in the axial direction. In the second embodiment, the length to which the rod 48 is pushed by the piston 68 and the sliding amount of the separator 36 in the axial direction are the same. For this reason, it is easy to set and adjust the sliding amount of the separator 36.

In contrast to this, in the first embodiment, the rod 48 is rotatably supported by the spindle 64, so a structure that slidably retains the rod 48 as in the second embodiment is unnecessary and a simplification in structure can be achieved.

Furthermore, in a structure where the rod 48 itself slides and causes the separator 36 to slide, a high degree of straightness and positional precision (positional accuracy with respect to the die 24) is required of the rod 48. In the first embodiment, the rod 48 is not linked to the separator 36, and the separator 36 is slid by the rotation of the rod 48, so straightness is not required for the rod 48. Furthermore, in the first embodiment, high precision is also not required in terms of the positional precision of the rod 48. For this reason, the molding apparatus 22 can be configured at a low cost.

In the first embodiment, the posture of the rod 48 when causing the separator 36 to move toward the other end side in the axial direction is not limited. However, as described above (FIG. 6), when the rod 48 is rotated in the direction of arrow R3 from a posture along the radial direction of the die 24 (a horizontal posture) and causes the separator 36 to slide, a large amount of sliding can be ensured for the separator 36 with respect to the rotational angle of the rod 48.

Furthermore, when the rod 48 is rotated in the direction of arrow R3 from the horizontal posture, the distal end portion 48A of the rod 48 moves slightly outward in the radial direction of the die 24. However, the distal end portion 48A of the rod 48 touches the separator recessed portion 42 at the inclined plane 46 that inclines toward the open side (the lower side) of the die recessed portion 34 heading outward in the radial direction. Consequently, the separator 36 can be reliably pushed toward the core 26 side, namely, against the wall portion 38, utilizing some of the force that acts on the separator 36 from the distal end portion 48A of the rod 48.

It will be noted that the shape of the separator recessed portion in the molding apparatus of this application can also be exemplified by the shapes in the following third embodiment to fifth embodiment in addition to the shapes of the separator recessed portion in the preceding embodiments. In the third embodiment to the fifth embodiment, the same configuration as in the first embodiment or the second embodiment can be employed for the overall configurations of the molding apparatus, and illustration thereof will be omitted.

Figure 11:
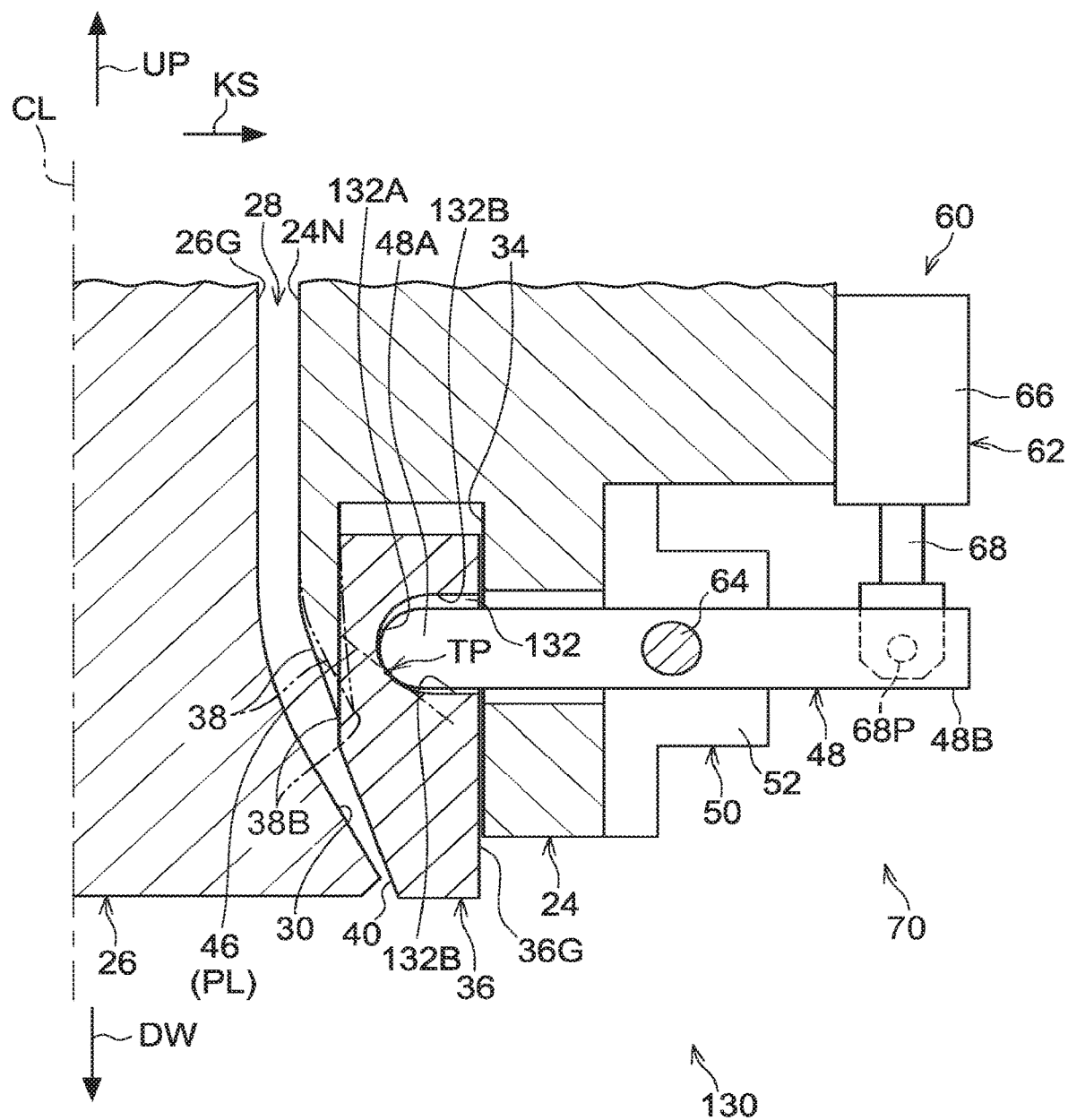
FIG. 11 is an enlarged sectional view showing part of a molding apparatus of a third embodiment of the disclosure.

In a molding apparatus 130 of a third embodiment, as shown in FIG. 11, a separator recessed portion 132 has a curved surface 132A on the far side (the portion near the centerline CL), and the open side (the portion far from the centerline CL) has a cylinder surface 132B in the shape of a cylinder that continues from the curved surface 132A and has a constant diameter heading toward an outer peripheral surface 36G The curved surface 132A is a surface in the shape of a hemisphere that has the same radius as that of the curved surface 42A of the first embodiment. The cylinder surface 132B is a surface in the shape of a cylinder that has a constant diameter heading toward the outer peripheral surface 36G. Consequently, the separator recessed portion 132 has a shape along the radial direction.

Additionally, the distal end portion 48A of the rod 48 touches the curved surface 132A. A tangent plane PL at a touchpoint TP is an inclined plane 46 that inclines toward the open side (the lower side) of the die recessed portion 34 heading outward in the radial direction.

Figure 12:
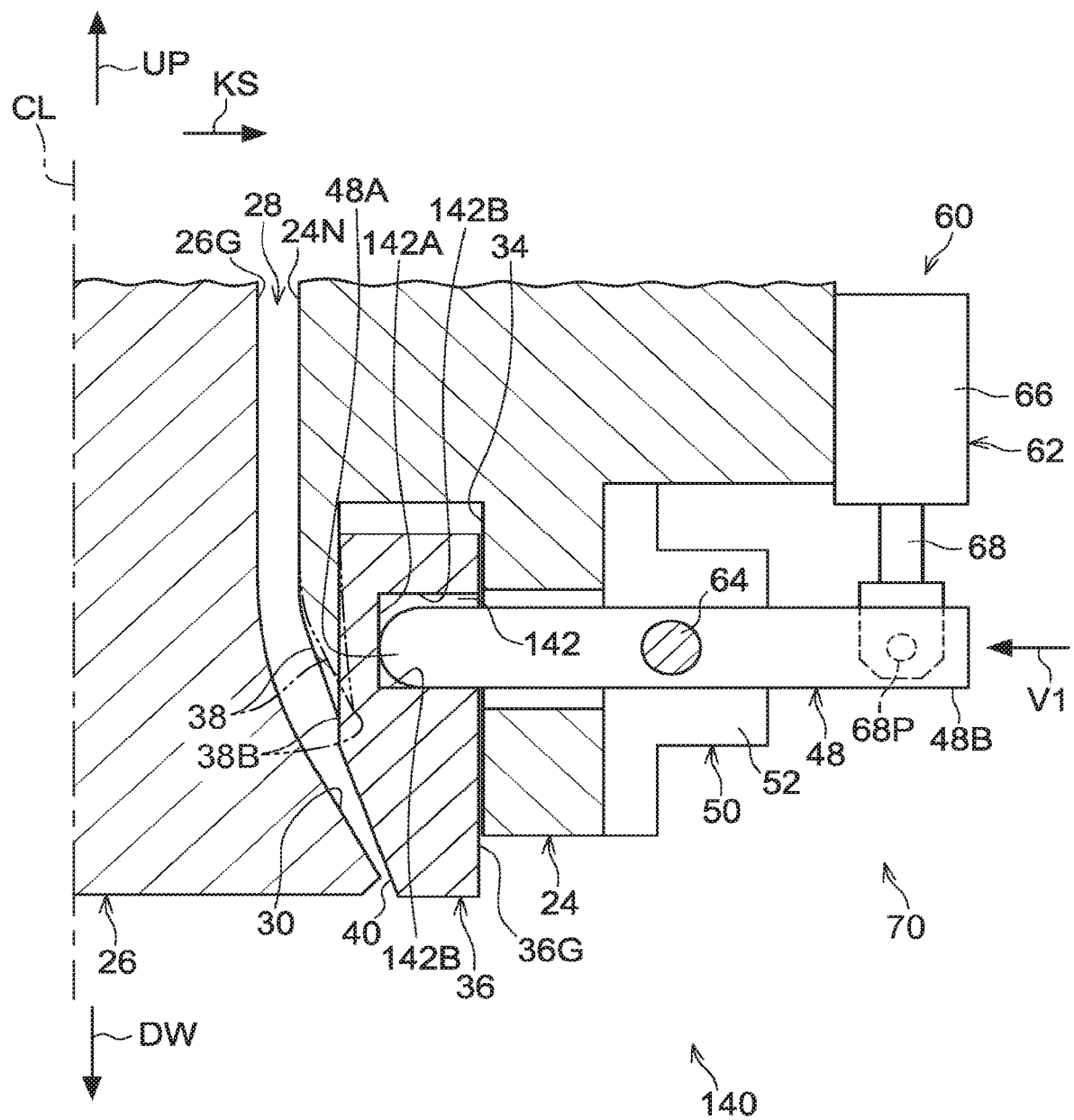
FIG. 12 is an enlarged sectional view showing part of a molding apparatus of a fourth embodiment of the disclosure.

In a molding apparatus 140 of a fourth embodiment, as shown in FIG. 12, a separator recessed portion 142 has a disc surface 142A on the far side and a cylinder surface 142B on the open side. The disc surface 142A is a circular flat surface as viewed in the direction of V1 from the open side. The cylinder surface 142B is, like in the third embodiment, a surface in the shape of a cylinder that has a constant diameter heading toward an outer peripheral surface 36G Namely, the separator recessed portion 142 has a shape along the radial direction.

In this way, even when the boundary lines 44 of the separator recessed portion have a shape along the radial direction of the die 24 (the boundary lines 44U and 44L are parallel to each other), a structure where a force outward in the radial direction does not act on the separator 36 from the rod 48 when the rod 48 has moved outward in the radial direction can be realized.

Figure 13:
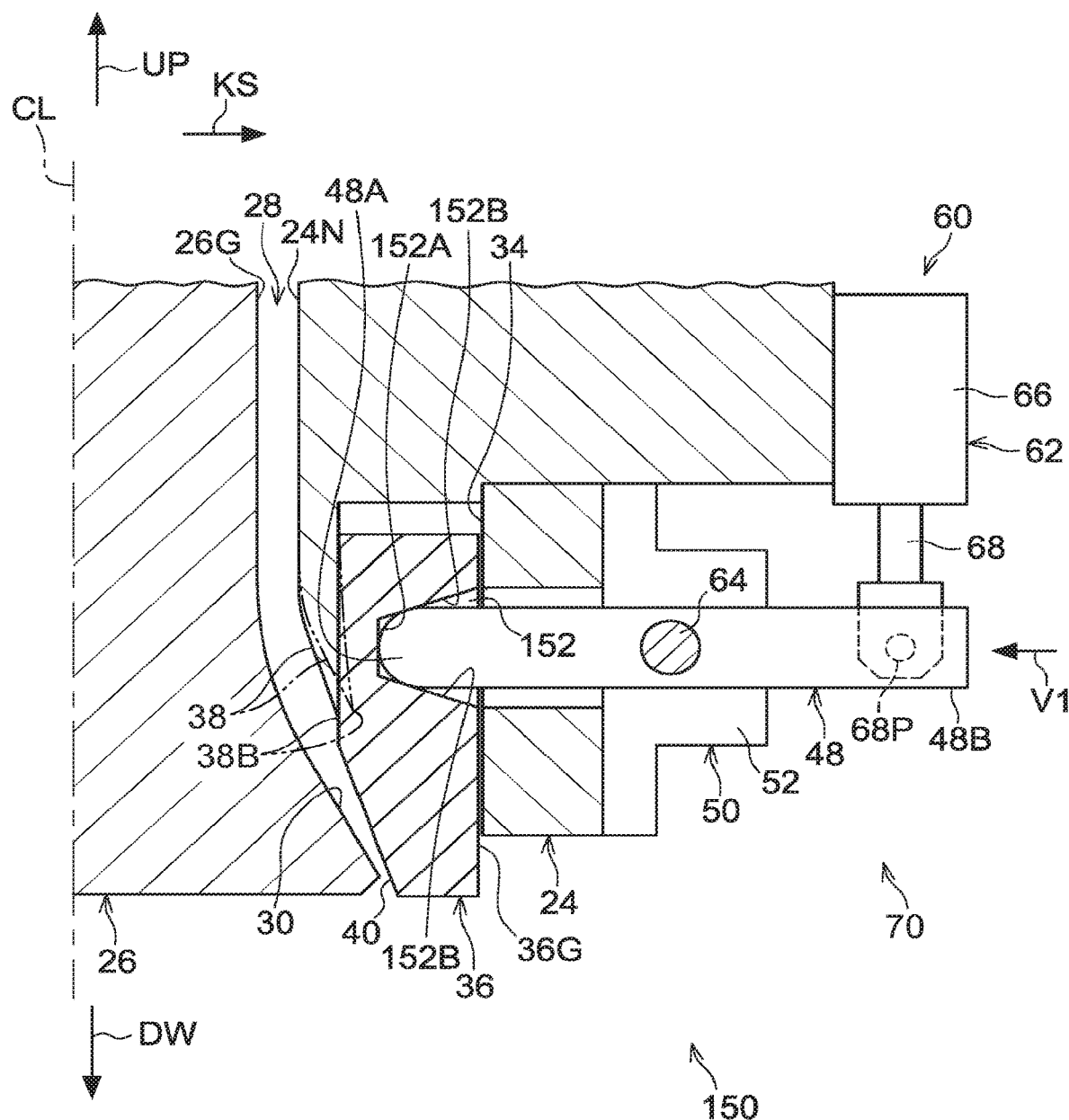
FIG. 13 is an enlarged sectional view showing part of a molding apparatus of a fifth embodiment of the disclosure.

In a molding apparatus 150 of a fifth embodiment, as shown in FIG. 13, a separator recessed portion 152 has a disc surface 152A on the far side and an enlarged-diameter surface 152B on the open side. The disc surface 152A is, like in the fourth embodiment, a circular flat surface when viewed in the direction of arrow V1 from the open side. The enlarged-diameter surface 152B is, like in the first embodiment, a surface that is widened in the shape of a circular truncated cone heading toward an outer peripheral surface 36G Consequently, the separator recessed portion 152 has a shape that is widened heading outward in the radial direction from inside in the radial direction.

Additionally, in the fifth embodiment, a structure where the distal end portion 48A of the rod 48 touches the enlarged-diameter surface 152B can be employed. A tangent plane PL at the touchpoint TP is the enlarged-diameter surface 152B, and the enlarged-diameter surface 152B is also the inclined plane 46 that inclines toward the open side (the lower side) of the die recessed portion 34 heading outward in the radial direction.

In the fifth embodiment also, the separator recessed portion 152 has the enlarged-diameter surface 152B. Namely, the separator recessed portion 152 has a structure where a force outward in the radial direction does not act on the separator 36 from the rod 48 when the rod 48 has moved outward in the radial direction.

In the preceding embodiments, examples are given where the separator is equipped with the opposing surface 40 (see FIG. 2, etc.) that inclines in the direction away from the core 26 heading toward the other end side (the lower side), but the separator may also be one that does not have a surface that inclines in this way. For example, in a molding apparatus 160 of a modified embodiment shown in FIG. 14, a separator 162 does not have a surface (the opposing surface 40 in FIG. 3, etc.) that inclines in the direction away from the core 26 heading toward the other end side (the lower side). However, the width of the flow passage 28 can be changed by sliding the separator 162 in the axial direction.

Figure 14:
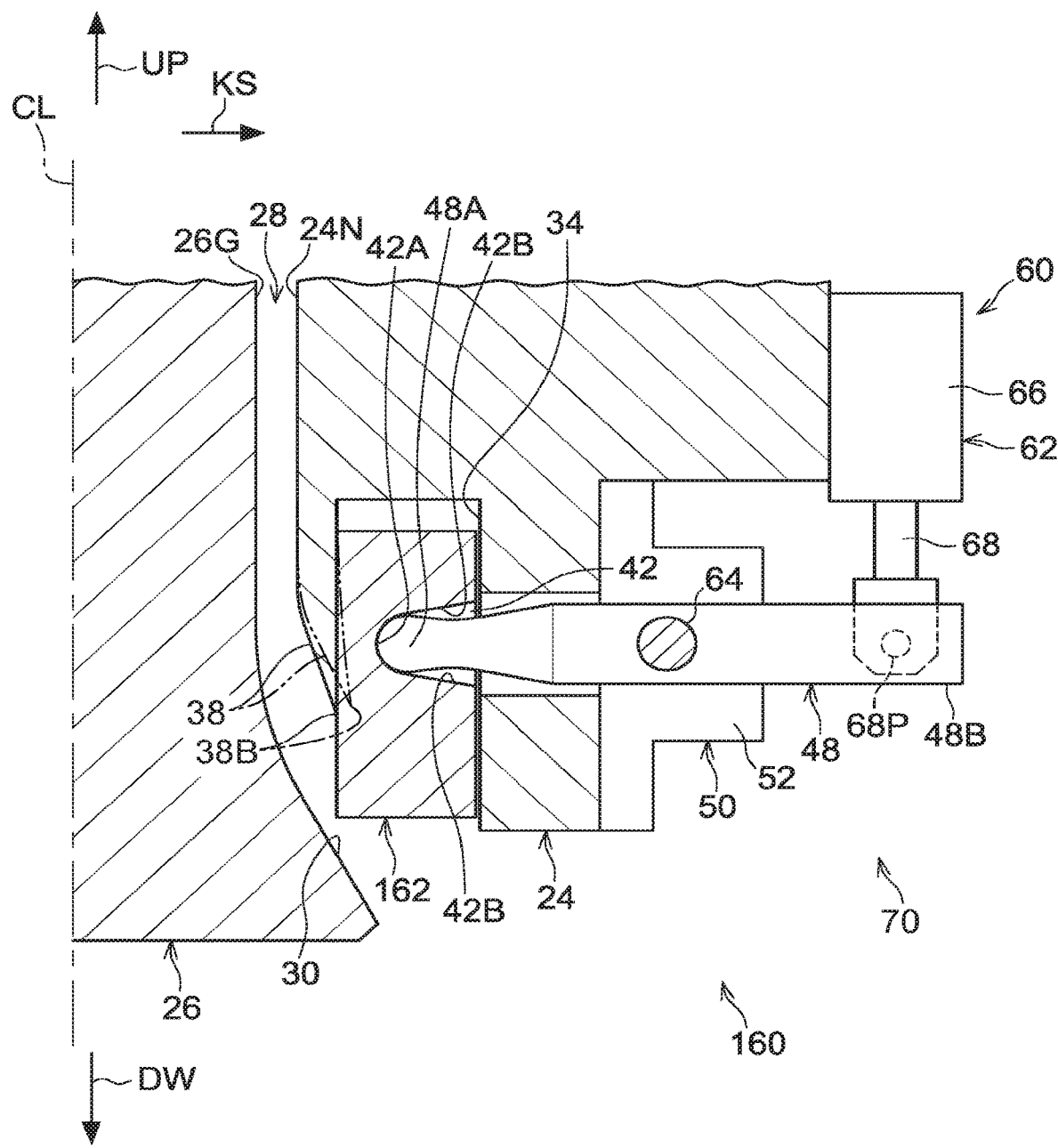
FIG. 14 is an enlarged sectional view showing part of a molding apparatus of a modified first embodiment.

It will be noted in relation to the modified embodiment shown in FIG. 14 that although the overall configuration of the molding apparatus is the same as the configuration of the molding apparatus of the first embodiment, instead of this, it is also possible to apply the modified embodiment to the molding apparatus of the second to fifth embodiments.

In all of the second to fifth embodiments and the modified embodiment described above, the wall portion 38 subjected to the pressure of the molten resin flowing through the flow passage 28 flexibly deforms in such a way that the distal end 38B side heads outward in the radial direction. The distal end 38B side of the wall portion 38 is pushed against the separator 36, and the formation of a gap between the wall portion 38 and the separator 36 is more reliably restrained. For this reason, the molten resin can be restrained from flowing out from between the wall portion 38 and the separator 36, which can contribute to the stable operation of the molding apparatus 22 and keeping the size and cost of the molding apparatus 22 from increasing.

Embodiments of the disclosure have been described above, but the disclosure is not limited to the above-described structures and can be modified and implemented in various ways in a range that does not depart from the claims.

What is claimed is:

1. A molding apparatus comprising:
a die having a hollow cylinder shape and provided with a die recessed portion that is open toward a second side in an axial direction of the die;
a core disposed on a radial direction inner side of the die, being relatively movable toward a first side and the second side in an axial direction of the die with respect to the die, and forming a flow passage for molten resin between the core and the die;
a slider housed in the die recessed portion in a state in which a gap in the die radial direction exists between the slider and the die recessed portion, the slider being slidable in the die axial direction;
a wall portion forming part of an inner wall in the die radial direction of the die recessed portion, positioned to oppose the core, and extending in such a way that a thickness of the wall portion gradually decreases heading from the first side toward the second side in the die axial direction; and
a slide mechanism causing the slider to slide in the die axial direction,
wherein the wall portion is elastically flexible outward in the die radial direction in a case in which the wall portion is pushed by the molten resin flowing through the flow passage.

2. The molding apparatus according to claim 1, wherein:
the slide mechanism has a rod and a moving unit,
a slider recessed portion is formed at a surface of the slider at a die radial direction outer side of the slider, which is an opposite side from a core side,
a distal end portion of the rod is housed in the slider recessed portion in an unlinked state with the slider,
the slider is slid in the die axial direction by movement of the distal end portion of the rod in the die axial direction,
the moving unit is attached to the die and causes the distal end portion of the rod to move in the die axial direction, and
inner surfaces of the slider recessed portion on the first side and the second side in the die axial direction have a shape that is widened outward from inside in the die radial direction or that is substantially parallel in the die radial direction.

3. The molding apparatus according to claim 1, wherein the core has a core enlarged-diameter portion in which a diameter of the core is enlarged in such a way that an opposing surface of the core enlarged-diameter portion that opposes the wall portion inclines outward in the die radial direction heading toward the second side.

4. The molding apparatus according to claim 2, wherein the core has a core enlarged-diameter portion in which a diameter of the core is enlarged in such a way that an opposing surface of the core enlarged-diameter portion that opposes the wall portion inclines outward in the die radial direction heading toward the second side.

* * * * *